United States Patent [19]

Baader

[11] Patent Number: 4,571,515
[45] Date of Patent: Feb. 18, 1986

[54] SMALL MOTOR ASSEMBLY
[76] Inventor: Edward J. Baader, 232 Stephen La., Springfield, Ohio 45505
[21] Appl. No.: 654,493
[22] Filed: Sep. 26, 1984
[51] Int. Cl.⁴ ........................................... H02K 15/00
[52] U.S. Cl. ..................................... 310/42; 310/154; 310/239
[58] Field of Search ................... 310/42, 154, 40 MM, 310/239

[56] References Cited
U.S. PATENT DOCUMENTS

| | | | |
|---|---|---|---|
| 2,894,156 | 7/1959 | Kent | 310/154 |
| 3,445,692 | 5/1969 | Kato | 310/154 |
| 3,600,615 | 8/1971 | Morita | 310/154 X |
| 3,714,705 | 2/1973 | Lewis | 310/90 X |
| 4,414,481 | 11/1983 | De Jong | 310/42 |

Primary Examiner—Donovan F. Duggan
Attorney, Agent, or Firm—David H. Semmes; Warren E. Olsen

[57] ABSTRACT

Dynamoelectric motors, particularly, a brush and brush holder assembly which comprises two semi-circular motor casing elements manufactured of non-insulating material. The semi-circular casing elements may be snap-fitted together, so as to support the individual brushes in contact with a commutator. The brush holder is characterized by its structural simplicity and ease of assembly.

5 Claims, 6 Drawing Figures

SMALL MOTOR ASSEMBLY

BACKGROUND OF THE INVENTION (1) Field of the Invention

Electric motors, particularly brush holder and brush assemblies for supporting the brushes in resilient contact with the rotating commutator element.

(2) Description of the Prior Art

Being submitted separately in an Information Disclosure Statement.

SUMMARY OF THE INVENTION

A brush holder assembly for dynamoelectric motors, including a pair of semi-circular motor casing sides snap-fitted together, so as to support the individual brushes in radial abutment with the rotating commutator element. The motor casing sides are characterized by axially extending flanges for engagement with a magnet ring housing at one end and a motor casing top cap at the other end. Each motor casing side includes a radially extending compression spring and a brush which is urged inwardly against a commutator.

DESCRIPTION OF THE PREFERRED EMBODIMENTS

Figure 1:
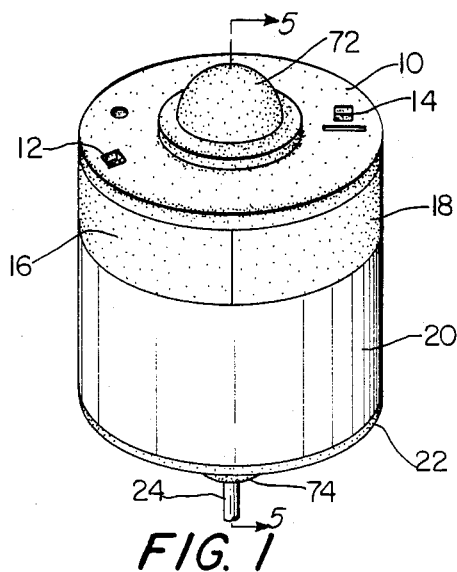
FIG. 1 is a perspective view of the assembly, including semi-circular motor casing sides snap-fitted together and superposed with respect to a magnet ring housing.

In FIG. 1 a small motor assembly is illustrated as including a closed motor case top cap 10 having apertures 12 and 14 for the individual brush "pigtails" 48 and 50. A pair of semi-circular motor casing sides 16 and 18 are snap-fitted together so as to engage axially both the bottom of top cap 10 and a magnet ring housing 20. A bottom cap 22 including an axial protruberance 74 is illustrated with the shaft 24 extending axially through aperture 26.

Figure 2:
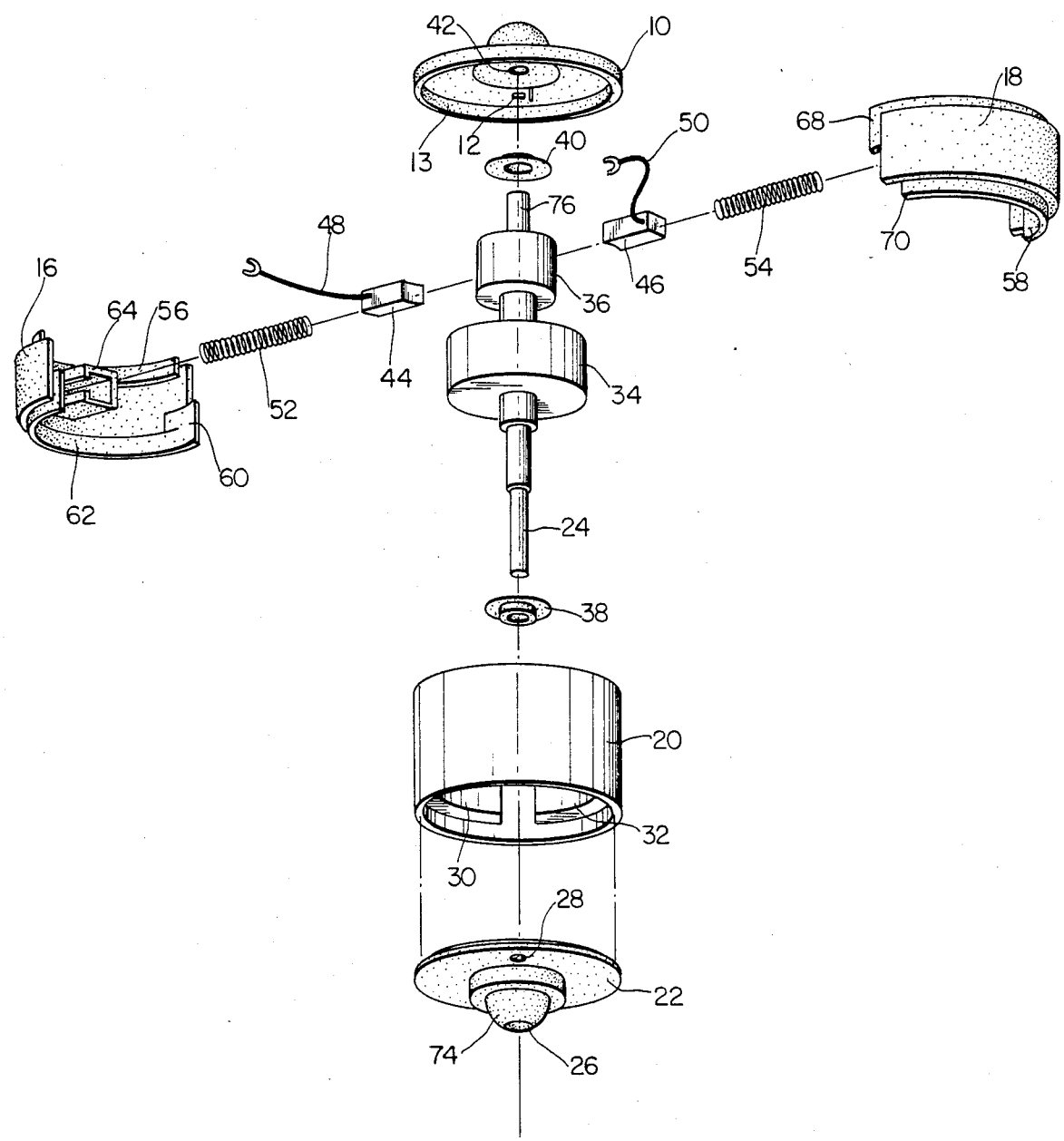
FIG. 2 is an exploded perspective view, showing fitting of the motor casing sides together, so as to support the brushes in radial contact with the commutator element.

In FIG. 2 the individual motor casing sides 16 and 18 are illustrated as encircling shaft 24 seated at its base 76 within bearing surface 42 in top cap 10. Oil slinger elements 40 and 38 may be employed at opposed ends of shaft 24. Motor casing side 16 includes bottom axially extending flange 62 having a peripherally extending snap-fitting tab 60. Top flange 56 engages the inner surface 13 of top cap 10. The individual brush or card element 44 together with compression spring 52 is supported within radially extending rectangular housing 64 having a radial slot 66. The individual pigtail 48 may extend through aperture 12 in top cap 10. In motor casing element 18 there is included a top flange terminating in a peripheral tab 68 and a bottom flange 58 terminating in inset shoulder 70. The tabs 60, 68 snap-fit together, as the bottom flanges 62, 58 are seated in the magnet ring housing 20. As the brushes 44, 46 and compression springs 52, 54 are inserted in their respective housing, the brushes are supported in axial contact with the rotating commutator element 36.

Figure 3:
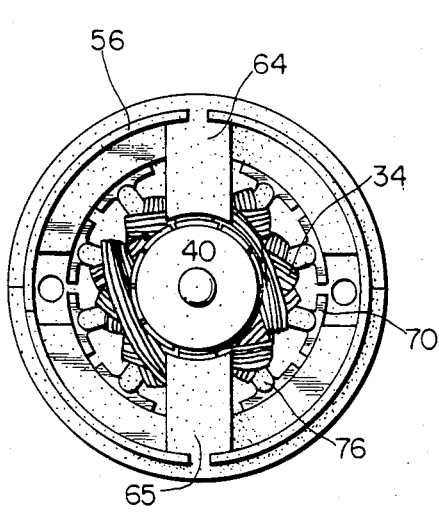
FIG. 3 is a top plan of the assembly with the motor casing top cap removed and showing the armature in place.
Figure 4:
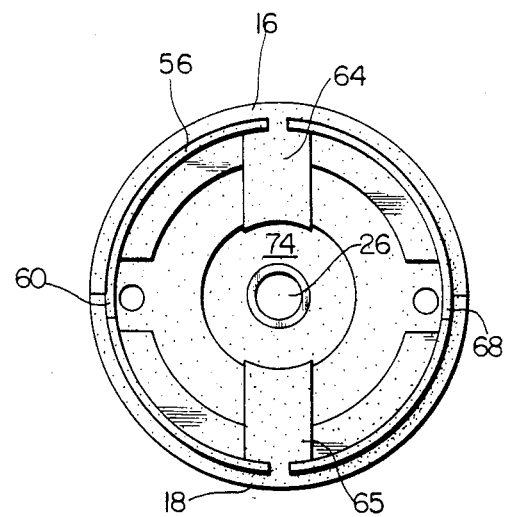
FIG. 4 is a top plan of the assembly with the armature removed.
Figure 5:
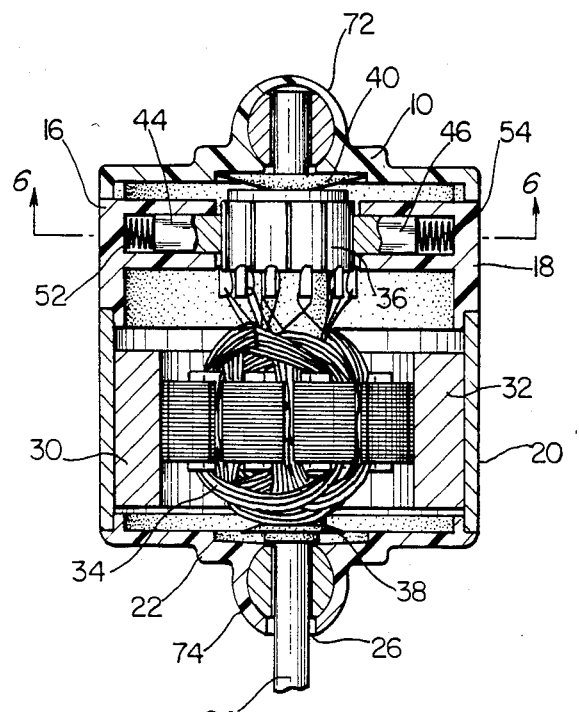
FIG. 5 is a vertical section, taken along section line 5—5 of FIG. 1 and illustrating the completely assembled device.
Figure 6:
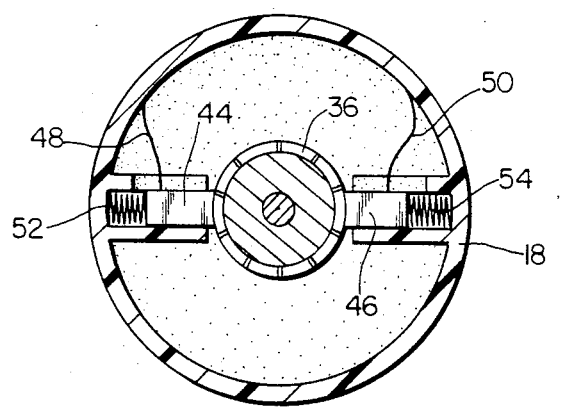
FIG. 6 is a transverse section, taken along section line 6—6 of FIG. 5.

As illustrated in FIGS. 3 and 5, armature element 34 is supported in a circular grid 70 having radially extending spokes 76. The grid 70 rotates axially intermediate at the individual magnets 30, 32.

As will be apparent, the motor casing may be readily assembled by supporting the bottom cap 22 within in a stationary block, fitting the magnet ring housing 20 onto the top cap and supporting the individual motor casing sides 16, 18 against lateral displacement, while inserting compression spring 52, 54 and the respective brushes 44, 46 into place.

Manifestly, variations in the motor casing sides and assembly may be imparted without departing from the spirit and scope of invention.

I claim:

1. In a dynamoelectric motor a brush holder and brush assembly comprising:
   a. A magnet ring housing adapted for supporting curvate magnet elements;
   b. a pair of semi-circular motor casing sides snap-fitted together, so as to extend axially from an end of said magnet ring housing, each motor casing side, further including:
      i. top and bottom axially extending flanges;
      ii. laterally extending tapered end tabs, the opposed end tabs on each motor casing side being complementally engageable with each other; and
      iii. a radially extending brush housing having an open radially extending slot in its side supporting a compression spring and brush assembly in contact with the commutator;
   c. a motor casing top cap and a motor casing bottom cap both made of electrical insulating material and engaging, respectively, said pair of semi-circular motor casing sides and said magnet ring housing; and
   d. a shaft extending from said motor casing top cap through said motor casing bottom cap, said shaft rotatably supporting a commutator in contact with said brushes; and an armature assembly contacting said curvate magnetic elements.

2. A brush holder and brush assembly for a dynamoelectric motor as in claim 1, said motor casing top cap including a bearing seat for an end of said shaft.

3. A brush holder and brush assembly for a dynamoelectric motor as in claim 1, said motor casing top cap being engageable with the interior walls of said magnet ring housing.

4. A brush holder and brush assembly in a dynamoelectric motor as in claim 3, further including oil slinger elements encircling said shaft at the outer end of said commutator and at the outer end of said armature.

5. A brush holder and brush assembly in a dynamoelectric motor as in claim 4, each said brush assembly including pigtail elements extensible through said brush housing slots and apertures in said motor casing cap.

* * * * *